Oct. 17, 1944.   J. J. MILLER   2,360,360
WIRE BOUND BOX
Filed Feb. 12, 1940   2 Sheets-Sheet 1
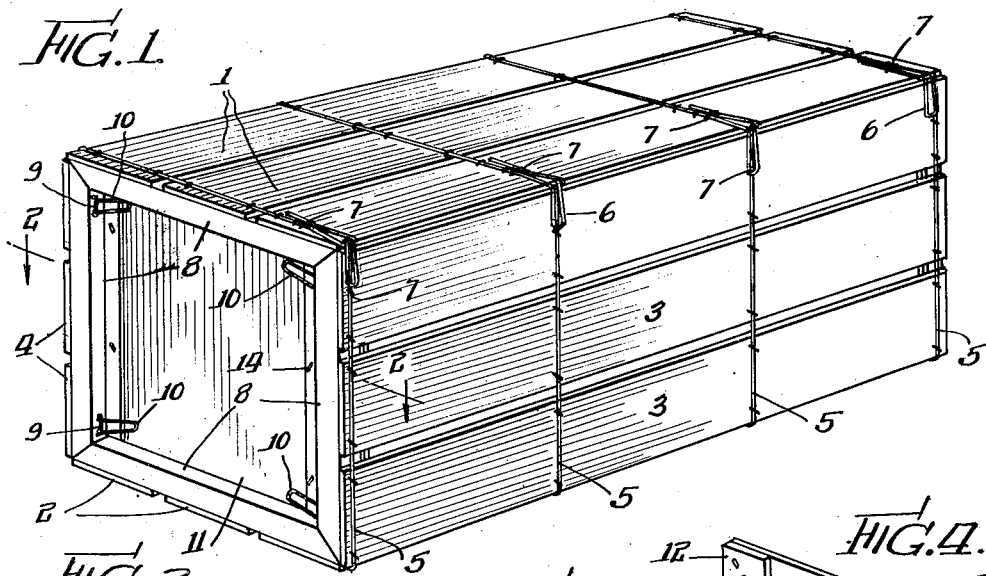
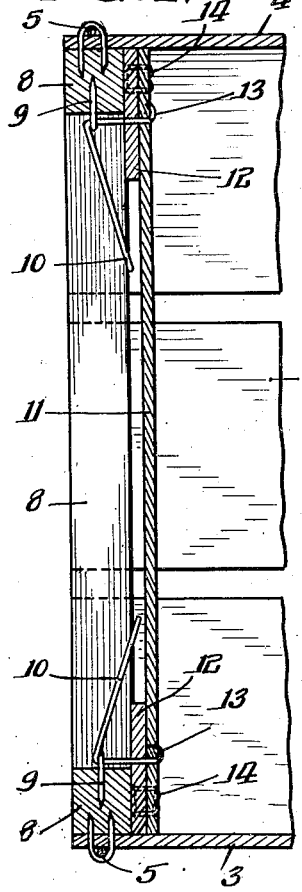
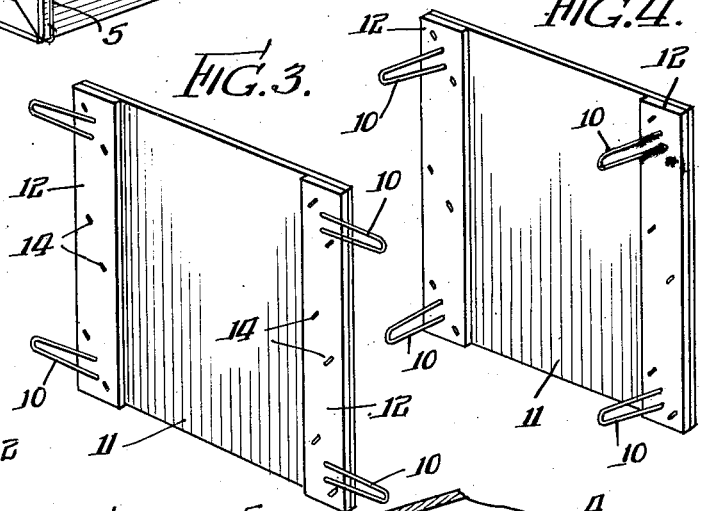
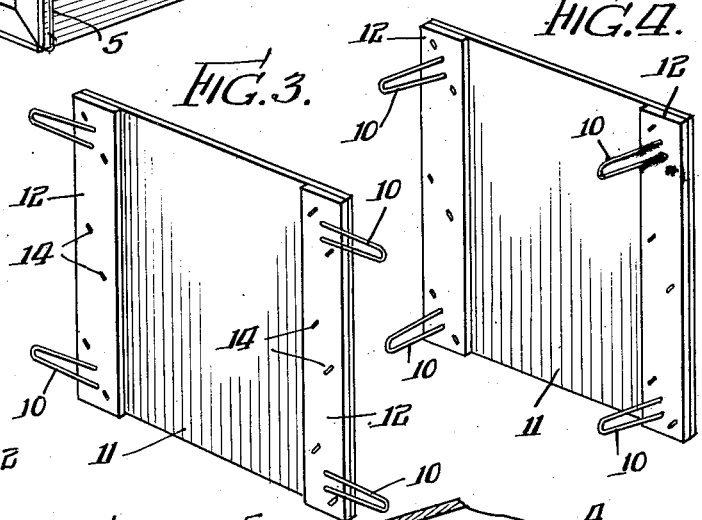
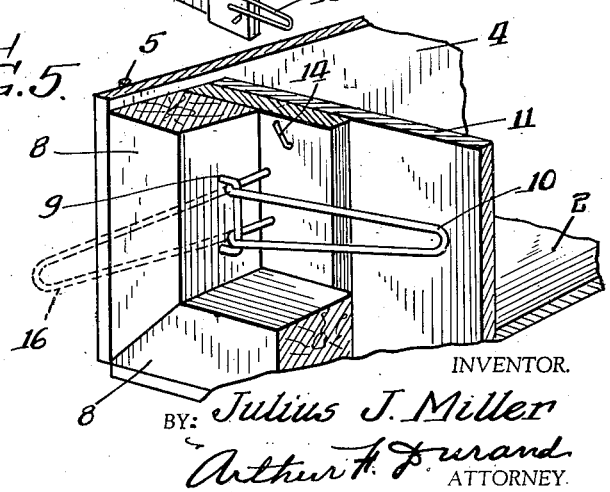
INVENTOR.
BY: Julius J. Miller
Arthur H. Durand
ATTORNEY.

Oct. 17, 1944.　　　　J. J. MILLER　　　　2,360,360
WIRE BOUND BOX
Filed Feb. 12, 1940　　　　2 Sheets-Sheet 2
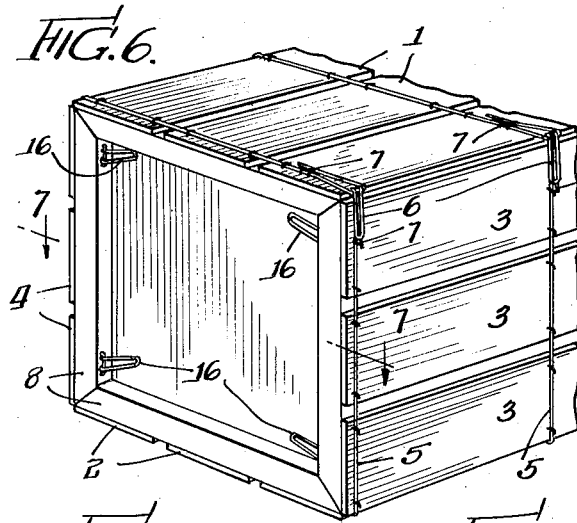
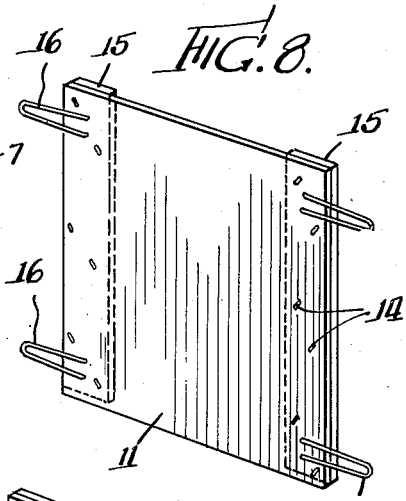
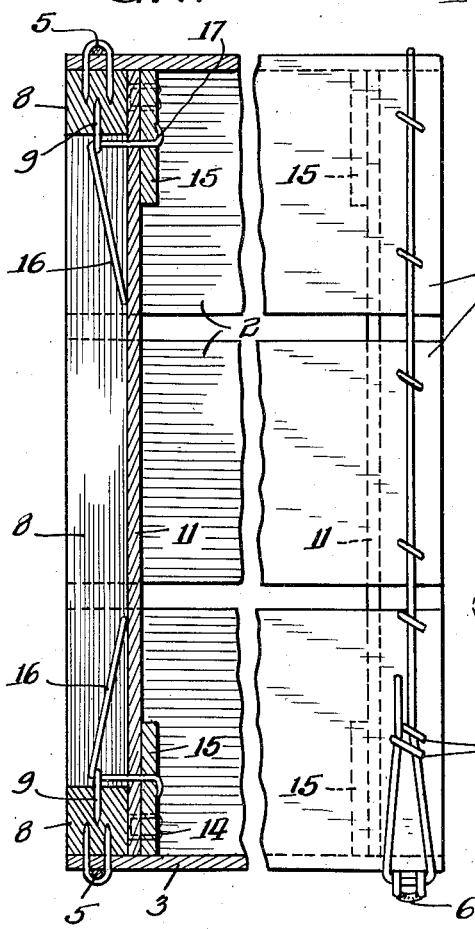
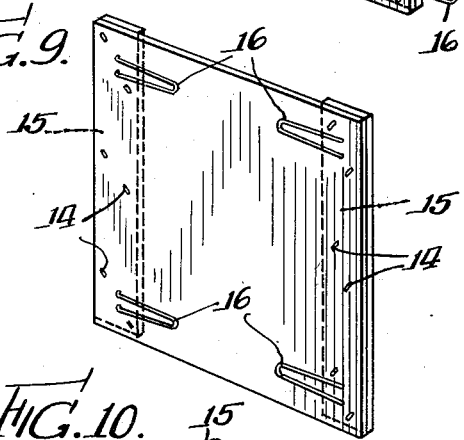
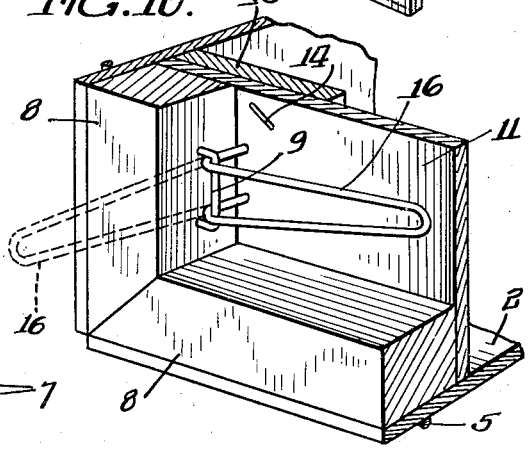
INVENTOR.
BY Julius J. Miller
Arthur H. Durand
ATTORNEY.

Patented Oct. 17, 1944

2,360,360

UNITED STATES PATENT OFFICE 2,360,360

WIRE BOUND BOX

Julius J. Miller, St. Joseph, Mich.

Application February 12, 1940, Serial No. 318,396

3 Claims. (Cl. 217—12)

This invention relates to wirebound boxes, and more particularly to those that are provided with attachable and removable end walls or heads that are provided with flexible tongues or members adapted for insertion through slots formed one way or another on the cleats of the box blank.

Generally stated, the object of the invention is to provide a novel and improved construction whereby it is unnecessary to cut notches or slots or anything of that kind in the cleats of the box blank to form the said slots, the latter being simply firmed by relatively wide staples inserted in the cleats in position to receive the said tongues or flexible members under the substantially flat heads of these staples, thereby to removably hold the end walls of the box in position therein.

It is also an object to provide certain details and features of construction tending to increase the general efficiency and desirability of a wirebound box of this particular character.

To the foregoing and other useful ends, the invention consists in matters hereinafter set forth and claimed and shown in the accompanying drawings, in which—

Fig. 1 is a perspective of a wirebound box embodying the principles of the invention.

Fig. 2 is an enlarged horizontal section on line 2—2 in Fig. 1 of the drawings.

Fig. 3 is a perspective of one of the heads or end walls of the box before it is incorporated in the ultimate structure of said box.

Fig. 4 is a similar view showing the tongues or flexible members bent into position to be inserted through the slots on the cleats of the box blank.

Fig. 5 is a fragmentary perspective view, partly in section, showing one of the tongues or flexible members inserted through its allotted wide staple on one of the cleats and then bent around against the end wall.

Fig. 6 is a view similar to Fig. 1, showing a different form of the invention.

Fig. 7 is an enlarged horizontal section on line 7—7 in Fig. 6 of the drawings.

Fig. 8 is a perspective of one of the heads or end walls of the box shown in Fig. 6 of the drawings, showing the same in condition to be packed flat with the shook formed by the heads or end walls and the wirebound box blank, when the latter is spread out flat.

Fig. 9 is a view similar to Fig. 8, but showing the tongues or flexible members bent over the head or end wall, instead of projecting from the edges thereof.

Fig. 10 is an enlarged fragmentary view of one corner portion of the box shown in Fig. 6, showing the tongue or flexible member bent into position to retain the head or end wall in place.

As thus illustrated, and referring to Figs. 1 to 5 inclusive, the invention comprises a flexible box blank composed of the top and bottom walls 1 and 2, and the front and back walls 3 and 4, all flexibly connected together by the binding wires 5 that preferably have their ends provided with interlocking loops 6 of any suitable or desired character, except that in this case both sides of each loop are stapled tight to the blank by a pair of staples 7, so that the strain or pull is on these staples when the box is loaded and closed.

The four sections of the flexible wirebound box blank thus formed are provided with cleats 8 of any suitable character, and the bottoms or inner edges of these cleats are provided with wide flat-headed staples 9 that are not fully inserted therein, so that under the head of each staple there is in effect a slot to receive one of the tongues or flexible members 10 that are inserted in the heads or end walls 11 of the box. Preferably, as shown in Figs. 1 to 5 of the drawings, each head or end wall has a pair of outside reinforcing strips of battens 12, and the staplelike members 10 are driven through these strips and through the head or end wall and then clinched tightly at 13 on the inner side of the end wall. It will be understood that the said strips 12 are fastened in place by staples 14 that can be driven either outwardly or inwardly through the two layers of veneer or similar material, it being understood that the sides of the box and cleats are also preferably of wood.

When the blank and the two heads or end walls are folded flat into a shook for shipment, the tongues or members 10 may extend outwardly beyond the edges of the head or end wall, as shown in Fig. 3 of the drawings. When the box is assembled, these tongues or flexible members 10 are bent into the position shown in Fig. 4 of the drawings, so that they will be inserted in the slots formed by the wide staples 9 previously mentioned. Then each tongue or flexible member is folded back against the head or end wall in the manner shown in Figs. 1, 2 and 5 of the drawings.

In Figs. 6 to 10 inclusive, the construction is similar to that previously described, but in this form of the invention the strips or battens 15 are on the inner sides of the heads or end walls, instead of being on the outside thereof. In this way, the head or end wall comes tight against the inner sides of the cleats 8, as shown in Figs. 7 and 10 of the drawings. Also, in this form of the invention, the tongues or flexible members 16 are first inserted through the head or end wall itself, and then through the strips or battens 15, and the ends of the wire are then clinched at 17 on the inner sides of said strips or battens, as shown more clearly in Fig. 7 of the drawings.

In each form of the invention, it will be understood that the flat-headed staples 9 are preferably inserted deeply into the cleats 8, in a manner to prevent them from pulling out.

As is usual, in both forms of the invention, the said binding wires 5 are preferably stapled in place on the four sections of the flexible box blank.

Thus, in effect, slots are provided on the cleats of the box blank, in a manner that obviates the necessity of notching or slotting or in any way cutting the cleats either before or after they are fastened to the veneer walls of the blank, and these slots thus in effect formed by the wide staples 9 are in position to receive the bail-shaped wire tongues or flexible members on the heads or end walls of the box, these tongues being inserted through the heads or end walls at points a substantial distance from the edges of the heads or end walls. Obviously, therefore, the cutting of notches or slots in the cleats is not necessary, and in addition no portion of the wire tongues or flexible members 10 or 16 are required to extend between the walls of the blank and the edges of the heads or end walls of the box.

It is important to observe, as shown by the drawings, that one of each pair of staples 7 is wider than the other, and that while the relatively wide staple straddles both sections of the wire, the relatively narrow staple straddles only the section of wire that terminates close by in a cut end of the wire. With this arrangement, of course, the relatively narrow staple must be driven first, and the relatively wide staple is driven after the end portion of the wire is bent around against the said relatively narrow staple.

Of course, the wide staples that are driven in the cleats to form slots for the wire tongues, may be applied at any suitable stage of the process of making the box blank. For example, these staples that form the slots may be inserted in the cleats before the latter are placed in the machine that staples the binding wires to the sheets and cleats, as the said machine can be provided with grooves in the cleat guides for these staples, as the heads of the latter are parallel with the cleats and with the said guides.

Looking at Fig. 2 of the drawings and Fig. 5 thereof, it will be seen that each tongue 10 extends outwardly from the end wall a distance less than the width of the cleat, when the tongue is bent into fastening position. Thus the outer side of each end wall is flush and smooth and not interrupted or made rough by any of the wire fastening means, as the latter are all inside of the common plane of the outer sides of the cleats, so that nothing extends outwardly beyond said plane.

Looking at the drawings, it is obvious that the heads of the staples 9 must extend lengthwise or longitudinally of the cleats, and it is also obvious that the tongues 10 are spaced from the side walls of the box a distance equal to or a little more than the thickness of the cleats 8 into which the said staples are inserted. When the tongues 10 are first inserted in the staples 9, each tongue in its entirety is practically spaced a distance from the adjacent side wall. However, when the tongues are bent back against the end wall their end portions are then spaced a greater distance from the side wall, but the base portions of said tongues remain spaced practically the thickness of the cleats from the side walls. Moreover, said tongues 10 are inserted under the heads of the staples 9 by movement of the end wall bodily toward the cleats, and it is impossible, for example, to insert these tongues by downward edgewise motion of the end wall bodily. To the contrary, for the insertion of the tongues 10 they must be at right angles to the end walls, as shown in Fig. 10 of the drawings, and the end wall must then be moved bodily toward the cleats, so that the tongues will slip easily into and through the staples on the cleats. Obviously, when the box is knocked down or taken apart for shipment, the tongues 10 will be bent out to extend at substantially right angles to the end wall or head of the box, and this end wall will then be moved bodily away from the cleats 8, thus pulling the tongues out of the slots provided by the staples 9 that are shown inserted in two of the cleats.

Desirably, as shown, the staples 9 are in the transverse middle of the cleats. Thus the head of each staple is midway between and parallel with the sides of the cleat. This facilitates assembling of the parts, in making the blank, as either side of the cleat may face inwardly or outwardly.

Essentially, it will be seen, the flexible tongues 10 are substantially at right angles to the head or end wall 11 when the tongues are in position for insertion under the heads of the staples 9 on the inner edges of the cleats. Preferably, the cleats having these staples are vertical when the box is completed and ready for filling. The box is preferably rectangular in cross section, but it may be of any suitable or desired shape or form without departing from the spirit of the invention.

What I claim as my invention is:

1. A collapsible wirebound box of the character described comprising side walls and end walls, cleats attached to said side walls, and means for removably attaching said end walls in fixed position with respect to said side walls comprising relatively wide staples inserted in the inner sides of said cleats to provide openings positioned interiorly of the cleats and extending in planes substantially longitudinally thereof, and relatively narrow staples secured to said end walls in position to extend substantially perpendicularly outward from the plane of the end walls and to be directly received in said openings upon movement of the end walls lengthwise of said side walls, said relatively narrow staples being adapted to be bent inwardly towards said end walls after insertion through said openings to rigidly and fixedly secure the end walls to the cleats and side walls.

2. A collapsible wirebound box of the character described comprising side walls and end walls, cleats attached to said side walls, and means for removably attaching said end walls in fixed position with respect to said side walls comprising relatively wide headed staples inserted in the inner sides of said cleats to provide slotted openings positioned interiorly of the cleats and extending in planes substantially longitudinally thereof, and bendable tongue-like members secured to said end walls in position to extend substantially perpendicularly outward from the plane of the end walls and to be directly received in said slotted openings upon movement of the end walls lengthwise of said side walls, said bendable members being adapted to be bent inwardly towards said end walls after insertion through said slotted openings to rigidly and fixedly secure the end walls to the cleats and side walls.

3. A collapsible wirebound box of the character described comprising side walls and end walls, cleats attached to said side walls, and means for removably attaching said end walls in fixed position with respect to said side walls comprising relatively wide headed staples inserted in the inner sides of said cleats in substantially the longitudinal mid-planes thereof to provide slotted openings positioned interiorly of the cleats and extending substantially in said longitudinal planes, and bendable tongue-like members secured to said end walls in position to extend substantially perpendicularly outward from the plane of the end walls and to be directly received in said slotted openings upon movement of the end walls lengthwise of said side walls, said bendable members being adapted to be bent inwardly towards said end walls after insertion through said slotted openings to rigidly and fixedly secure the end walls to the cleats and side walls with all portions of the bendable members positioned interiorly of the ends of said box.

JULIUS J. MILLER.